(12) United States Patent
Furrer

(10) Patent No.: US 9,233,626 B2
(45) Date of Patent: Jan. 12, 2016

(54) BUS BAR

(71) Applicant: FURRER + FREY AG, Bern (CH)

(72) Inventor: Beat Furrer, Bern (CH)

(73) Assignee: FURRER + FREY AG, Bern (CH)

( * ) Notice: Subject to any disclaimer, the term of this patent is extended or adjusted under 35 U.S.C. 154(b) by 0 days.

(21) Appl. No.: 14/390,205

(22) PCT Filed: Oct. 30, 2013

(86) PCT No.: PCT/EP2013/072695
§ 371 (c)(1),
(2) Date: Oct. 2, 2014

(87) PCT Pub. No.: WO2014/067989
PCT Pub. Date: May 8, 2014

(65) Prior Publication Data
US 2015/0224896 A1    Aug. 13, 2015

(30) Foreign Application Priority Data
Nov. 2, 2012   (DE) .................... 10 2012 021 358

(51) Int. Cl.
*B60M 1/24* (2006.01)
*B60M 1/30* (2006.01)

(52) U.S. Cl.
CPC *B60M 1/24* (2013.01); *B60M 1/307* (2013.01)

(58) Field of Classification Search
USPC ....................................... 174/70 B
See application file for complete search history.

(56) References Cited

U.S. PATENT DOCUMENTS 3,985,211 A * 10/1976 Bommart ................. B60M 1/24
  191/23 A
5,957,254 A *  9/1999 Furrer ..................... B60M 1/12
  191/40

FOREIGN PATENT DOCUMENTS

| DE | 102009022963 A1 * | 12/2010 | ............. B60M 1/305 |
| DE | 102011006308 A1 | 10/2012 | |
| EP | 0593350 A1 | 4/1994 | |
| GB | 2415176 A1 | 12/2005 | |

OTHER PUBLICATIONS

International Search Report, PCT/EP2013/072695, dated Feb. 17, 2014, 2 pages.

* cited by examiner

*Primary Examiner* — William H Mayo, III
*Assistant Examiner* — Krystal Robinson
(74) *Attorney, Agent, or Firm* — Senniger Powers LLP

(57) ABSTRACT

The busbar for holding a contact wire of electrically driven vehicles has an elongate, integral box profile which is slotted in the longitudinal direction and has two mutually opposite spring-elastic tensioning arms and spring-elastic clamping arms fitted at the ends of the tensioning arms. In order to prevent corrosion as the result of condensation water, bores (26, 27) are introduced into the clamping arms (7, 8) and are close to tips (9, 10) of the clamping arms, which tips are held by a contact wire (2). Preferably, these bores (26, 27) are fitted in pairs and have a distance of one third of the total length of the busbar from the respective end of the busbar.

13 Claims, 3 Drawing Sheets

BUS BAR

REFERENCE TO RELATED APPLICATIONS

This application is a U.S. national stage application of International Patent Application No. PCT/EP2013/072695, filed Oct. 30, 2013, and claims the benefit of priority of German Application No. 10 2012 021 358.1, filed Nov. 2, 2012, the entire disclosures of which are incorporated herein by reference.

FIELD OF THE INVENTION

The invention relates to a bus bar for holding a contact wire for electrically driven vehicles.

BACKGROUND

Such a bus bar is known from EP 0 593 350. This bus bar has a longitudinally extending, one-piece profile slotted in the longitudinal direction with a transverse carrier from which two tensioning arms project substantially vertically. A clamping arm is attached at the end of each tensioning arm and runs at an acute angle to an axis of symmetry. The tensioning arms and/or the clamping arms are constructed in a spring-elastic manner so that the contact wire is held exclusively by the spring power of the tensioning arms and/or of the clamping arms. At least one clamping arm has a bore in the vicinity of its tip for the runoff of condensation water.

DE 10 2009 022 963 A1 shows a similar profile of a bus bar that has a pair of recesses in the vicinity of the clamping arms.

DE 20 2004 009 420 U1 shows a similar profile of a bus bar but without bores.

JP H10-2262449 A suggests protecting bus bars from corrosion by water in that flexible coverings consisting of plastic are provided on both sides of the bus bar profile. These coverings can protect the bus bars from water coming from above for the side but not against condensation water of the generic bus bar profile.

U.S. Pat. No. 3,985,211 shows a bus bar with projections extending into its profile that serve for stability in conjunction with a spring element.

SUMMARY OF THE INVENTION

The invention therefore has the problem of improving the bus bar of the initially cited type in that it is better protected against corrosion.

This problem is solved by the features indicated in claim 1. Advantageous embodiments and further developments of the invention can be gathered from the subclaims.

The basic concept of the invention is to attach protective walls on the clamping arms which walls extend into the profile of the bus bar and form a conduit with the clamping arms, wherein the bores are directly adjacent to sidewalls of the protective walls.

Appropriate bores are preferably provided on both opposite clamping arms and preferably pairs of bores opposing each other transversely to the longitudinal extent of the bus bar, and more preferably three such pairs of bores distributed over the entire length of the particular bus bar.

The longitudinal axis of the bores preferably runs at a right angle to the outside of the particular clamping arm.

According to a further development of the invention the protective walls run approximately at a right angle to the clamping arms and therefore form a conduit running along the bus bar on both clamping arms, wherein the bore in the clamping arms borders directly on a side surface of the protective walls. This brings it about that occurring condensation water is collected in these two conduits and can flow off through the bores. Therefore, practically no water can enter between the clamping arms and the clamped-in contact wire.

BRIEF DESCRIPTION OF THE FIGURES

The invention is explained in more detail in the following using exemplary embodiments in combination with the drawings. In the drawings.

DETAILED DESCRIPTION OF PREPARED EMBODIMENTS

Figure 1:
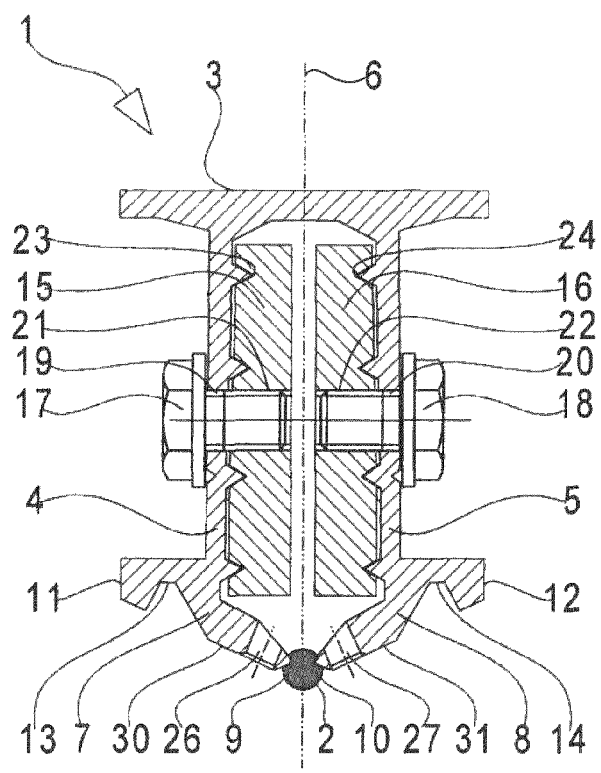
FIG. 1 shows a cross section of a bus bar according to a first exemplary embodiment of the invention.

FIG. 1 shows a bus bar 1 that has a longitudinally slotted cross-sectional profile into which a contact wire 2 is laid and held there in a positive manner. The bus bar 1 has a plate-shaped transverse carrier 3 with a level surface from which two tensioning arms 4 and 5, that lie mirror-symmetrically to an axis of symmetry 6, project substantially vertically. Starting from the transverse carrier 3, the tensioning arms 4 and 5 run gradually to a point, wherein the angle between the inner and the outer surface of the tensioning arms is approximately 1.5°. Clamping arms 7 and 8 are arranged on the free ends of the tensioning arms 4 and 5, which clamping arms project opposite the axis of symmetry 6 under an acute angle a from the tensioning arms 4 and 5 and run toward one another. The clamping arms 7 and 8 each have a tip 9, 10 that engage in correspondingly formed grooves of the contact wire. The grooves are arranged above a plane running through the central axis of the contact wire.

Lateral cantilever arms 11 and 12 facing away from the axis of symmetry 6 are arranged on the transitional area between the tensioning arms 4 and 5 and the clamping arms 7 and 8, the top side of which cantilever arms facing the transverse carrier 3 is level and whose bottom side facing away from the transverse carrier 3 has a recess or groove 13 or 14 that serves as a guide for a movable insertion device for the contact wire that spreads the tensioning arms and clamping arms apart for inserting the contact wire.

The transverse carrier 3 extends laterally on both sides past the tensioning arms 4 and 5 and is thickened in a transitional area to the tensioning arms via bevels.

The bus bar 1 forms in its totality a largely closed box profile interrupted only by a longitudinal slot for receiving the contact wire, which profile holds the contact wire. The profile is in its entirety resistant to bending and twisting to a high degree, wherein the tensioning arms and clamping arms can be moved back and forth to a slight extent in a spring-elastic manner relative to the axis of symmetry 6 in order to insert or place the contact wire 2. On the other hand, even this possibility of movement is limited in such a manner by the shaping, dimensioning and nature of the material that the contact wire 2 is securely held and is also securely held in the case of mechanical loads by the current collector of a vehicle.

The entire bus bar 1 is constructed as a one-piece profile that can be manufactured with an extrusion process. For example, aluminum or an aluminum alloy can be used as material that has good electrical conductivity so that the supplying of current to the contact wire can also take place via the bus bar 1.

For reasons of transport, ability to be handled and assembly, bus bars on a stretch have a maximum length of 10 to 12 m. For a stretch several bus bars are connected abutting each other on their front sides, which takes place by butt straps 15, 16 that are inserted into the inside of the bus bar profile and bridge the abutment position between two adjacent bus bars. Of course, it is also possible to attach the butt straps on the outside of the tensioning arms.

FIG. 1 shows two such butt straps 15, 16 that generally have a rectangular profile and are fastened on an associated tensioning arm. The length of the butt straps 15, 16 is on the order of magnitude of 40 cm. The butt straps serve for the electrical connection between two adjacent bus bar profiles as well as for the transfer of mechanical forces. The butt straps are fastened by screws 17, 18 that extend through bores 19, 20 of the tensioning arms 4, 5 and are screwed into threaded bores 21, 22 of the butt straps 15, 16. Only two to four screws are needed per butt strap that are screwed on both sides of a bus bar abutment on adjacent bus bars.

Due to a play in the bores 19, 20 a small but nevertheless unfavorable deflection of the bus bar axes could occur, as a result of which a bend can result at the abutment position. Such a bend has a negative influence on the acceptance of current since the current collector is deflected there and therefore cannot continuously slide on the contact wire 2, as a result of which contact forces can increase or decrease between the current acceptor and the contact wire and there is the danger that the current acceptor jumps off the contact wire and reduces the force and therefore also the supply of current. These mechanical, geometrical and electrical disadvantages are unacceptable for a high-speed overhead bus bar. To this end, in addition to the screw connection, a positive connection between the bus bars and the butt straps is additionally realized in principle with a groove and spring connection.

To this end projections 23, 24 are attached on the tensioning arms 4 and 5 which projections engage in corresponding recesses of the butt straps and therefore create a positive and bend-resistant connection as regards a sagging. The butt straps can be present on the inside and/or the outside of the tensioning arms. The projections can have the triangular profile shown in FIG. 1. However, they can also have other shapes such as, e.g., trapezoidal or rectangular. A triangular or trapezoidal profile brings about a wedge effect that ensures that a firmly seated connection of the groove and spring connection always takes place even if a certain play is present in the manufacturing of the projections and/or of the grooves. Of course, the projections and recesses can also be exchanged so that the projections are attached on the butt straps and the recesses on the tensioning arms.

Figure 2:
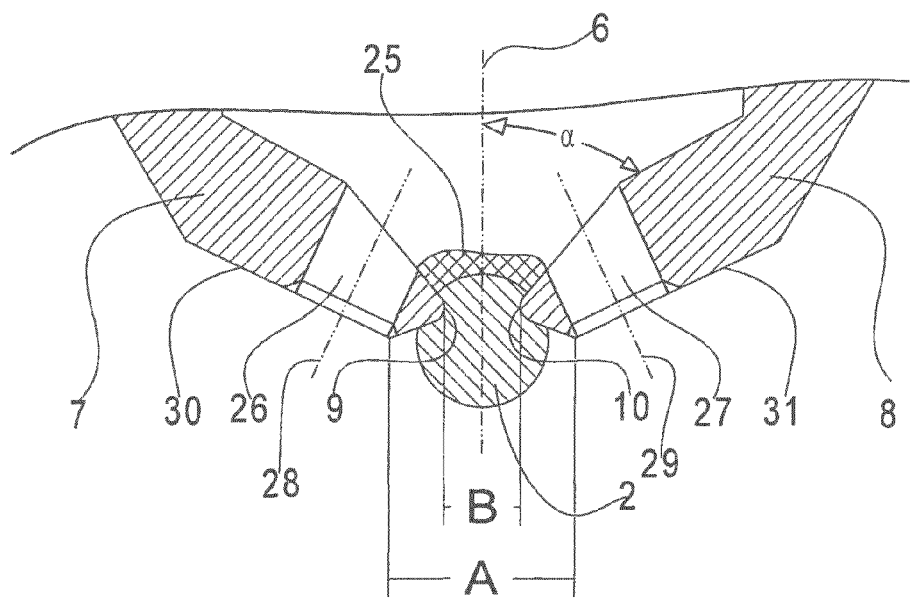
FIG. 2 shows an enlarged view of the clamping arms of FIG. 1.

Prior to the insertion of the contact wire into the bus bar profile its grooves are filled without gaps and continuously with a graphite grease. The grease is pressed out of the grooves by the clamping of the contact wire on the tips 9 and 10 of the clamping arms 7 and 8 and also displaced partially upward, which is indicated in FIG. 2 by a dotted line 25.

Therefore, the bus bar profile is largely sealed against the outside. However, condensation water can form inside the bus bar profile that favors a corrosion. In order to solve this problem the invention suggests providing bores 26, 27 on the clamping arms 7 and 8 that are arranged close to the tips 9 and 10 of the clamping arms. The central axis 28, 29 of the bores preferably runs vertically to the outer surface 30 31 of the clamping arms 7, 8.

If it is assumed that the cited graphite grease is also pressed into the inside of the profile during the insertion of the contact wire, then its edges border the bores 26, 27 and condensation water flows off via these bores without reaching the clamping area of the contact wire.

In a concrete exemplary embodiment the bores have a diameter of 8 mm and the distance A of the closest walls of the bores measured on the outsides of the clamping arms 7 and 8 is approximately 12.4 mm, at a distance B of the tips of the clamping arms 4.8 mm.

Chamfers are provided on the sides of the bores 26 and 27 and face the outer wall 30 and 31 of the clamping arms 7 and 8 and have, for example, an angle of 45°. The depth of the chamfers is then 0.8 mm.

Figure 3:
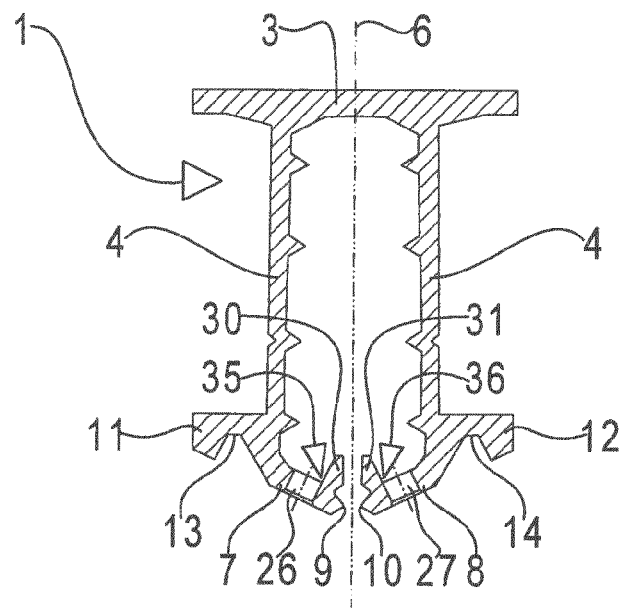
FIG. 3 show a cross section of a bus bar according to a second exemplary embodiment of the invention.
Figure 4:
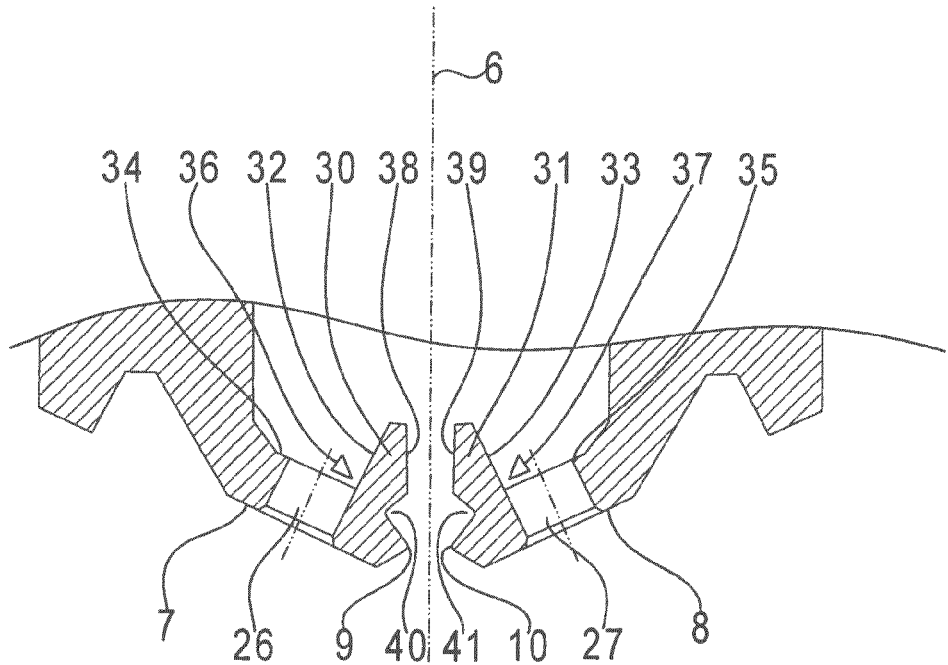
FIG. 4 shows an enlarged view of the clamping arms of the bus bar of FIG. 3.

According to a further development of the invention shown in FIGS. 3 and 4 protective walls 30, 31 are attached to both clamping arms 7 and 8 directly bordering their tips 9 and 10 and extend into the interior of the bus bar profile, wherein the pores 26, 27 directly follow side surfaces 32, 33 of the protective walls. Therefore, the surfaces 32 and 33 and inside surfaces 34, 35 of the clamping arms 7, 8 form a conduit 36, 37 in which water can collect and flow off through the bores 26 and 27. It is ensured by the only small slot between the facing surfaces 38 and 39 of the protective walls 30, 31 that practically no water can reach the contact wire 2 and the holding area of the contact wire on the tips 9 and 10 of the clamping arms 7 and 8.

If spray water should pass from below via the bores into the inner space of the bus bar profile, it will run off again shortly so that no problem is to be expected in this regard.

Furthermore, it is apparent from FIG. 4 that facing surfaces 38, 39 of the protective walls 31, 32 run parallel to the axis of symmetry 6 and have a groove 40, 41 that merges directly into the tips 9, 10. A part of the clamped-in contact wire 2 can be received in these grooves 40, 41. It can also be recognized that the surfaces 32, 33 of the protective walls 31, 32, which surfaces face away from the axis of symmetry, run at an acute angle to the axis of symmetry 6. Therefore, the protective walls 31, 32 are wedge-shaped. This brings it about that the slot between the two protective walls is as narrow as possible and that to the extent possible all condensation water passes into the conduits 35 and 36 and can flow off from them.

Figure 5:
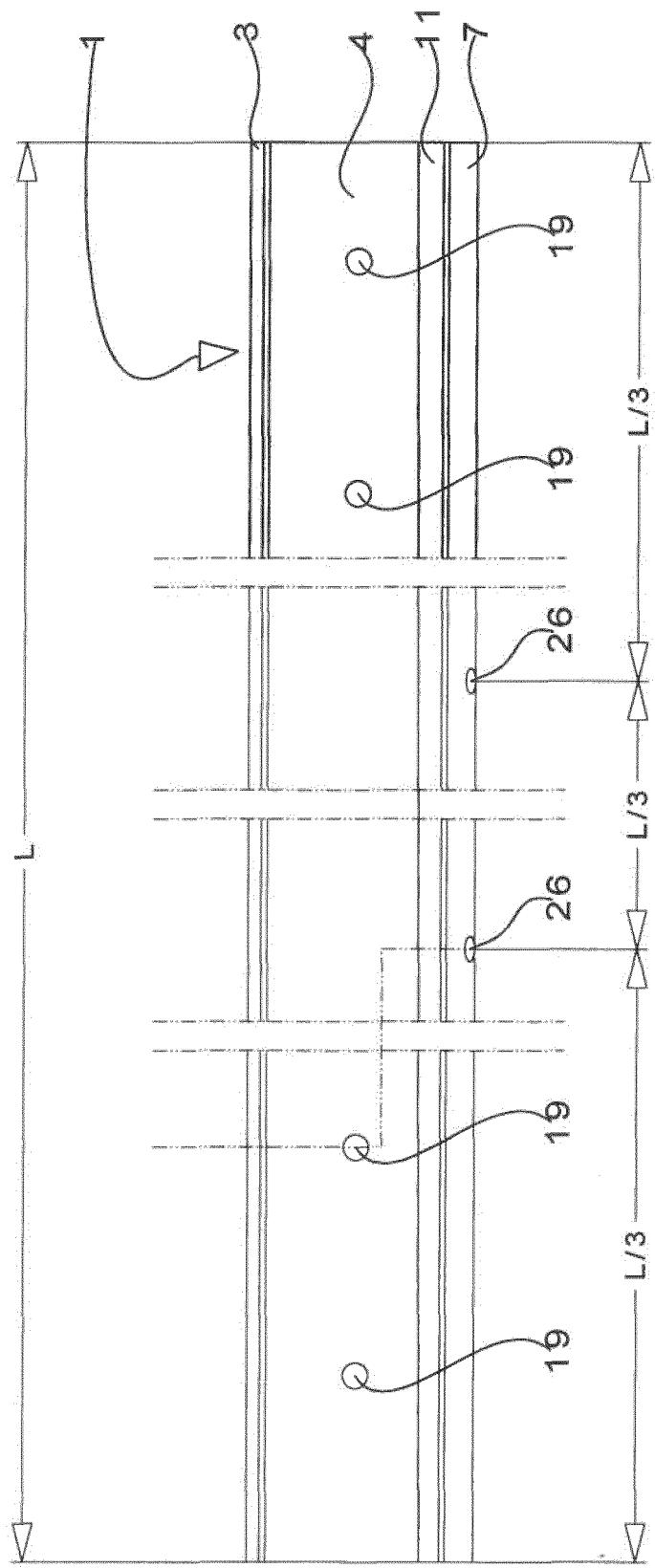
FIG. 5 shows a lateral view of a bus bar in accordance with the invention.

FIG. 5 shows a lateral view of a bus bar profile. The bores 26 and 27 can be arranged in any number and any arrangement along the bus bar profile 1. Given a length of the bus bars between 10 and 12 m it proved to be advantageous to provide two bores 26, 26 on each of the clamping arms 7 and 8 that have a distance of one third of the total length of the bus bar to the end of the bus bar and therefore also to each other. Of course, it is also possible to provide more than two such bores 26, 26 and to arrange them at other positions. If, for example, it is assumed that the bus bar has a sag in the middle area, it is advantageous to position appropriate bores at the lowest position. Since there is a small slot in any case at the end of the bus bars to the next bus bar, water can flow off there, for example, from the cited conduits 36 and 37 so that no bores are necessary in the immediate vicinity of the ends. But even here it is up to the determination of the person skilled in the art and the particular assembly conditions where the bores are to be positioned. Note for clarification that the concept "bore" comprises every type of holes, openings or drainages both as concerns their manufacture as well as their shape. They can therefore be manufactured, for example, also by stamping, laser beam cutting, water jet cutting or other known processing methods. They are also not limited to a circular shape but rather can have any suitable shapes such as, e.g., a rectangle, ellipse, oval, etc.

The holes 26, 27 are preferably provided in pairs on the clamping arms 7, 8 relative to the longitudinal direction of the bus bar 1.

The invention claimed is:

1. A bus bar for holding a contact wire comprising:
a longitudinally extended, one-piece profile slotted in the longitudinal direction with a transverse carrier from which two spring-elastic tensioning arms project substantially vertically and each tensioning arm is provided with a spring-elastic clamping arm that runs at an acute angle to an axis of symmetry, wherein a contact wire can be clamped in between opposing tips of the clamping arm, wherein the clamping arms comprise bores in the vicinity of their tips; and
protective walls on the clamping arms which walls project into the profile of the bus bar (1) and form, with the clamping arms, a conduit, wherein the bores directly border side walls of the protective walls.

2. The bus bar according to claim 1, characterized in that the protective walls run substantially vertically to the clamping arms.

3. The bus bar according to claim 2, characterized in that the protective walls are attached on ends of the clamping arms located in the vicinity of the tips of the clamping arms.

4. The bus bar according to claim 2, characterized in that opposite surfaces of the protective walls run parallel to the axis of symmetry and that surfaces of the protective walls, which surfaces face away from the axis of symmetry, run at an acute angle to the axis of symmetry.

5. The bus bar according to claim 2, characterized in that the opposing surfaces of the protective walls comprise grooves that merge directly into the tips of the clamping arms.

6. The bus bar according to claim 1, characterized in that the protective walls are attached on ends of the clamping arms located in the vicinity of the tips of the clamping arms.

7. The bus bar according to claim 6, characterized in that opposite surfaces of the protective walls run parallel to the axis of symmetry and that surfaces of the protective walls, which surfaces face away from the axis of symmetry, run at an acute angle to the axis of symmetry.

8. The bus bar according to claim 6, characterized in that the opposing surfaces of the protective walls comprise grooves that merge directly into the tips of the clamping arms.

9. The bus bar according to claim 1, characterized in that opposite surfaces of the protective walls run parallel to the axis of symmetry and that surfaces of the protective walls, which surfaces face away from the axis of symmetry, run at an acute angle to the axis of symmetry.

10. The bus bar according to claim 1, characterized in that the opposing surfaces of the protective walls comprise grooves that merge directly into the tips of the clamping arms.

11. The bus bar according to claim 1, characterized in that a central axis of the bores runs vertically to the outside surface of the clamping arms.

12. The bus bar according to claim 1, characterized in that the bores are arranged in pairs relative to the longitudinal extent of the bus bar.

13. The bus bar according to claim 1, characterized in that the bores have a distance of one third the total length of the bus bar in the longitudinal direction of the bus bar opposite the ends of the bus bar.

* * * * *